(12) United States Patent
Iwasaki et al.

(10) Patent No.: US 11,495,250 B2
(45) Date of Patent: Nov. 8, 2022

(54) MAGNETIC RECORDING DEVICE INCLUDING A MAGNETIC HEAD INCLUDING A STACKED BODY BETWEEN MAGNETIC POLES

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hitoshi Iwasaki, Nerima (JP); Naoyuki Narita, Funabashi (JP); Hirofumi Suto, Ota (JP); Masayuki Takagishi, Kunitachi (JP); Tazumi Nagasawa, Yokohama (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/398,516

(22) Filed: Aug. 10, 2021

(65) Prior Publication Data

US 2022/0157335 A1 May 19, 2022

(30) Foreign Application Priority Data

Nov. 19, 2020 (JP) .............................. JP2020-192364

(51) Int. Cl.
*G11B 5/127* (2006.01)
*G11B 5/31* (2006.01)
(Continued)

(52) U.S. Cl.
CPC .............. *G11B 5/1278* (2013.01); *G11B 5/23* (2013.01); *G11B 5/235* (2013.01); *G11B 5/313* (2013.01);
(Continued)

(58) Field of Classification Search
None
See application file for complete search history.

(56) References Cited

U.S. PATENT DOCUMENTS 7,957,098 B2 * 6/2011 Yamada ............... G11B 5/3146
360/125.3
8,879,206 B2 * 11/2014 Shimizu ............... G11B 5/3133
360/125.3
(Continued)

FOREIGN PATENT DOCUMENTS

JP          2002-92826 A        3/2002

OTHER PUBLICATIONS

U.S. Appl. No. 17/173,279, filed Feb. 11, 2021, Iwasaki, et al.

*Primary Examiner* — Jefferson A Evans
(74) *Attorney, Agent, or Firm* — Oblon, McClelland, Maier & Neustadt, L.L.P.

(57) ABSTRACT

According to one embodiment, a magnetic head includes a first magnetic pole, a second magnetic pole, and a stacked body provided between the first and second magnetic poles. The stacked body includes a first magnetic member, a second magnetic member provided between the first and second magnetic members, and a first layer provided between the first and second magnetic members, and including at least one selected from the group consisting of Cr, V, Mn, Ti and Sc. The first magnetic member includes first magnetic regions and a first non-magnetic region. A direction from one of the first magnetic regions toward another one of the first magnetic regions is along a first direction from the first magnetic pole toward the second magnetic pole. The first non-magnetic region is between the one of the first magnetic regions and the other one of the first magnetic regions.

19 Claims, 8 Drawing Sheets

(51) Int. Cl.
  *G11B 5/23* (2006.01)
  *G11B 5/235* (2006.01)
(52) U.S. Cl.
  CPC ............ *G11B 5/315* (2013.01); *G11B 5/3133* (2013.01); *G11B 5/3146* (2013.01)

(56) References Cited

U.S. PATENT DOCUMENTS

| | | | | |
|---|---|---|---|---|
| 8,953,283 | B2* | 2/2015 | Shimizu | G11B 5/35 360/125.3 |
| 9,007,721 | B2* | 4/2015 | Sato | G11B 5/3146 360/125.3 |
| 9,230,571 | B1* | 1/2016 | Chen | G11B 5/147 |
| 9,355,659 | B2* | 5/2016 | Koui | G11B 5/35 |
| 10,867,625 | B1* | 12/2020 | Freitag | G11B 5/235 |
| 11,043,232 | B1* | 6/2021 | Wu | G11B 5/3146 |
| 2002/0051380 | A1 | 5/2002 | Kamiguchi et al. | |
| 2013/0050869 | A1* | 2/2013 | Nagasaka | G11B 5/3146 360/75 |
| 2014/0306302 | A1* | 10/2014 | Jan | H01F 10/3272 257/421 |

* cited by examiner

MAGNETIC RECORDING DEVICE INCLUDING A MAGNETIC HEAD INCLUDING A STACKED BODY BETWEEN MAGNETIC POLES

CROSS-REFERENCE TO RELATED APPLICATIONS

This application is based upon and claims the benefit of priority from Japanese Patent Application No. 2020-192364, filed on Nov. 19, 2020; the entire contents of which are incorporated herein by reference.

FIELD

Embodiments described herein relate generally to a magnetic head and a magnetic recording device.

BACKGROUND

A magnetic head that uses a stacked body including magnetic layers is provided in a magnetic recording device.

Stable operations of the magnetic recording device are desirable.

DETAILED DESCRIPTION

Figure 1A:
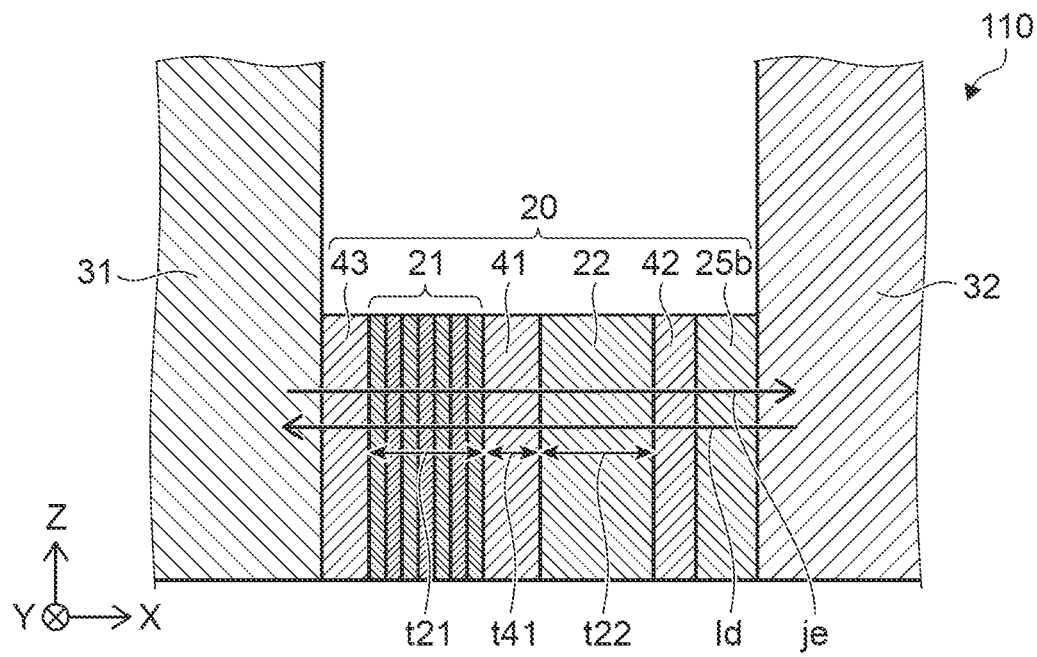
FIGS. 1A and 1B are schematic cross-sectional views illustrating a magnetic head according to a first embodiment.

According to one embodiment, a magnetic head includes a first magnetic pole, a second magnetic pole, and a stacked body provided between the first magnetic pole and the second magnetic pole. The stacked body includes a first magnetic member, a second magnetic member provided between the first magnetic member and the second magnetic member, and a first layer provided between the first magnetic member and the second magnetic member, and including at least one selected from the group consisting of Cr, V, Mn, Ti and Sc. The first magnetic member includes a plurality of first magnetic regions and a first non-magnetic region. A direction from one of the first magnetic regions toward another one of the first magnetic regions is along a first direction from the first magnetic pole toward the second magnetic pole. The first non-magnetic region is between the one of the first magnetic regions and the other one of the first magnetic regions. The first non-magnetic region includes at least one selected from the group consisting of Cr, V, Mn, Ti and Sc. The first magnetic regions include at least one selected from the group consisting of Fe, Co and Ni. A first layer thickness along the first direction of the first layer is thicker than a first non-magnetic region thickness along the first direction of the first non-magnetic region.

According to one embodiment, a magnetic recording device includes the magnetic head described above, and an electric circuit. The electric circuit is configured to supply a current to the magnetic head. The current has an orientation from the second magnetic member toward the first magnetic member.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
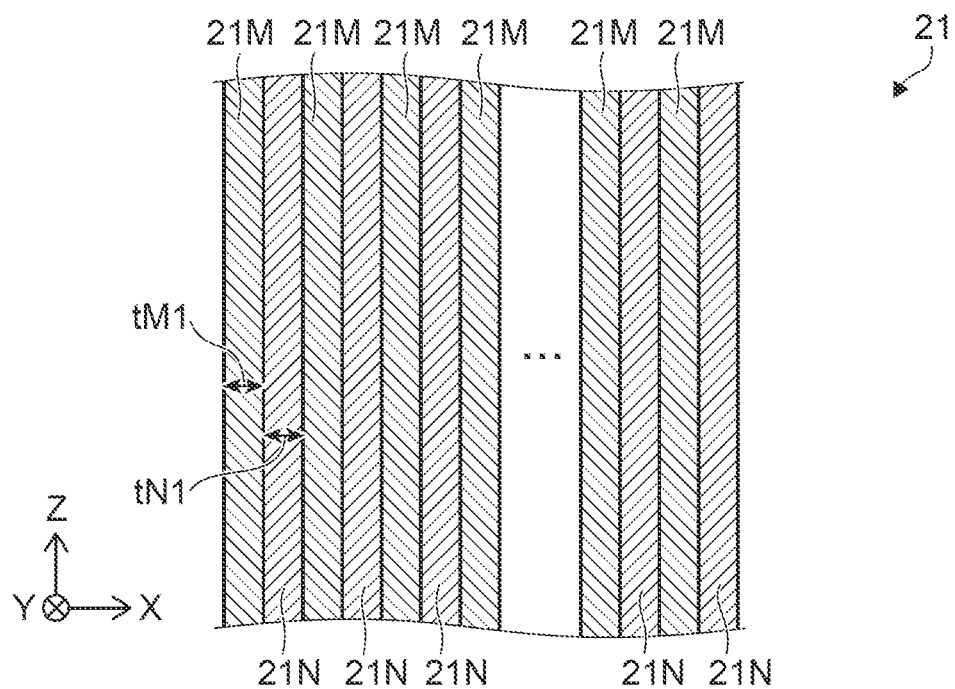

FIGS. 1A and 1B are schematic cross-sectional views illustrating a magnetic head according to a first embodiment.

Figure 2:
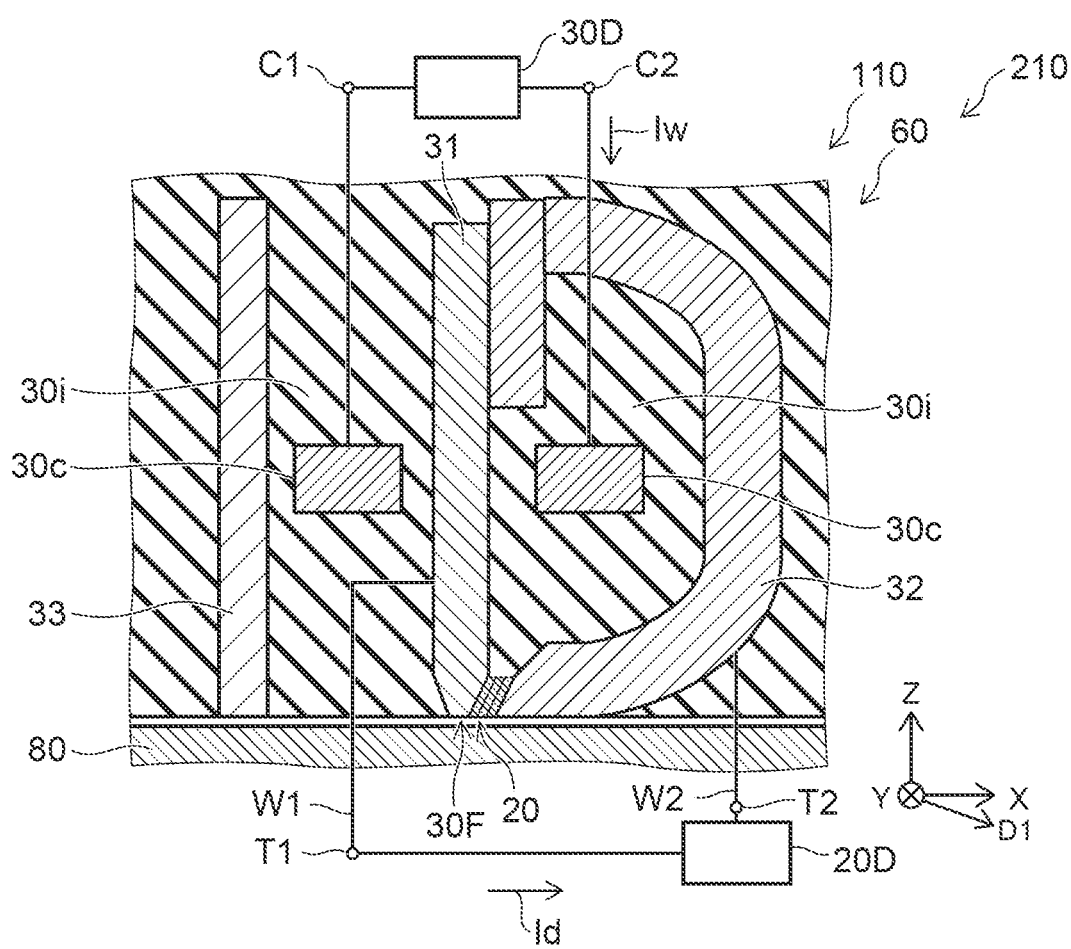
FIG. 2 is a schematic cross-sectional view illustrating a magnetic recording device according to the embodiment.

FIG. 2 is a schematic cross-sectional view illustrating a magnetic recording device according to the embodiment.

As shown in FIG. 2, the magnetic recording device 210 according to the first embodiment includes the magnetic head 110 and an electric circuit 20D. For example, a recording part 60 is provided in the magnetic head 110. As described below, the magnetic head 110 may include a reproducing part.

The magnetic recording device 210 may include a magnetic recording medium 80. Information is recorded in the magnetic recording medium 80 by the recording part 60 of the magnetic head 110. The magnetic recording medium 80 is, for example, a perpendicular recording medium. An example of the magnetic recording medium 80 is described below.

As shown in FIG. 1, the magnetic head 110 includes a first magnetic pole 31, a second magnetic pole 32, and a stacked body 20. The stacked body 20S is located between the first magnetic pole 31 and the second magnetic pole 32. The first magnetic pole 31 is, for example, a major magnetic pole. The second magnetic pole 32 is, for example, a trailing shield. According to the embodiment, the second magnetic pole 32 may be the major magnetic pole; and the first magnetic pole 31 may be the trailing shield. In the following, the first magnetic pole 31 is taken as the main magnetic pole and the second magnetic pole 32 is taken as the trailing shield.

For example, the first magnetic pole 31 and the second magnetic pole 32 form a magnetic circuit. For example, a coil 30c is provided at the first magnetic pole 31. For example, a recording circuit 30D is electrically connected to the coil 30c via a first coil terminal C1 and a second coil terminal C2, for example. A recording current Iw is supplied from the recording circuit 30D to the coil 30c. For example, a recording magnetic field that corresponds to the recording current Iw flowing in the coil 30c is generated from the first magnetic pole 31. At least a portion of the generated recording magnetic field is oriented toward the magnetic recording medium 80. At least a portion of the recording magnetic field is applied to the magnetic recording medium 80. The orientation of the magnetization of the portion of the magnetic recording medium 80 to which the recording magnetic field is applied is controlled by the recording magnetic field. Thereby, information that corresponds to the orientation of the recording magnetic field is recorded in the magnetic recording medium 80. For example, at least a portion of the recording magnetic field is oriented toward the second magnetic pole 32 after being oriented toward the magnetic recording medium 80.

For example, a direction D1 from the first magnetic pole 31 toward the second magnetic pole 32 is along an X-axis direction. One direction perpendicular to the X-axis direction is taken as a Z-axis direction. A direction perpendicular to the X-axis direction and the Z-axis direction is taken as a Y-axis direction.

A current Id can be supplied to the stacked body 20. For example, as described below, the current Id is supplied to the stacked body 20 via the first magnetic pole 31 and the second magnetic pole 32.

In one example, an orientation of a magnetization of a magnetic layer included in the stacked body 20 is reversed by the current Id. Thereby, the recording magnetic field is efficiently applied to the magnetic recording medium 80. In another example, the magnetization of the magnetic layer included in the stacked body 20 oscillates due to the current Id. For example, MAMR (Microwave Assisted Magnetic Recording) is performed thereby.

As shown in FIG. 1A, for example, when a current Id having an orientation from a second magnetic member 22 toward a first magnetic member 21 flows through the stacked body 20, the orientation of the magnetization of the magnetic layer included in the stacked body 20 is reversed. For example, when the current Id having the orientation from the second magnetic member 22 toward the first magnetic member 21 flows through the stacked body 20, an alternating magnetic field is emitted from the stacked body 20. For example, when an electron flow je having an orientation from the first magnetic member 21 toward the second magnetic member 22 flows through the stacked body 20, the orientation of the magnetization of the magnetic layer included in the stacked body 20 is reversed. For example, when the electron flow je having the orientation from the first magnetic member 21 toward the second magnetic member 22 flows through the stacked body 20, an alternating magnetic field is emitted from the stacked body 20.

As shown in FIG. 2, the first magnetic pole 31 includes a magnetic pole surface 30F. The magnetic pole surface 30F is, for example, an ABS (Air Bearing Surface). For example, the magnetic pole surface 30F faces the magnetic recording medium 80.

For example, a direction perpendicular to the magnetic pole surface 30F corresponds to the Z-axis direction. The Z-axis direction is, for example, the height direction. The X-axis direction is, for example, the down-track direction. The Y-axis direction is, for example, the cross-track direction.

As shown in FIG. 2, the electric circuit 20D is electrically connected to the stacked body 20. In this example, the stacked body 20 is electrically connected to the first and second magnetic poles 31 and 32. A first terminal T1 and a second terminal T2 are provided in the magnetic head 110. The first terminal T1 is electrically connected to the stacked body 20 via a first wiring W1 and the first magnetic pole 31. The second terminal T2 is electrically connected to the stacked body 20 via a second wiring W2 and the second magnetic pole 32. The current Id (e.g., a direct current) is supplied from the electric circuit 20D to the stacked body 20.

As shown in FIG. 2, a shield 33 may be provided in the recording part 60. The first magnetic pole 31 is located between the shield 33 and the second magnetic pole 32. An insulating portion 30i is provided around the shield 33, the first magnetic pole 31, and the second magnetic pole 32.

As shown in FIG. 1A, the stacked body 20 of the magnetic head 110 includes the first magnetic member 21, the second magnetic member 22, and a first layer 41. The second magnetic member 22 is provided between the first magnetic member 21 and the second magnetic pole 32. As will be described later, another layer such as a second layer 42 may be provided in the stacked body 20.

The first layer 41 is provided between the first magnetic member 21 and the second magnetic member 22. The first layer 41 includes at least one selected from the group consisting of Cr, V, Mn, Ti and Sc. The element included in the first layer 41 (an element including at least one selected from the group consisting of Cr, V, Mn, Ti and Sc) is taken as the first element. The first layer 41 is, for example, a Cr layer. The first layer 41 is a non-magnetic layer.

A direction from the first magnetic member 21 toward the second magnetic member 22 is taken as a first direction. The first direction is taken as the X-axis direction. For example, the first direction is along the direction D1 illustrated in FIG. 2. For example, the first direction (the X-axis direction) corresponds to the stacking direction. The first layer 41 is substantially along the X-Y plane.

As shown in FIG. 1B, the first magnetic member 21 includes multiple first magnetic regions 21M and a first non-magnetic region 21N. The direction from one of the multiple first magnetic regions 21M toward another one of the multiple first magnetic regions 21M is along the first direction from the first magnetic pole 31 toward the second magnetic pole 32. The first direction may be, for example, substantially the X-axis direction.

The first non-magnetic region 21N is between the one of the multiple first magnetic regions 21M and the other one of the multiple first magnetic regions 21M. Multiple first non-magnetic regions 21N are provided in the example. One of the multiple first magnetic regions 21M is between one of the multiple first non-magnetic regions 21N and another one of the multiple first nonmagnetic regions 21N.

The multiple first non-magnetic regions 21N include at least one selected from the group consisting of Cr, V, Mn, Ti and Sc. The element included in the multiple first non-magnetic regions 21N (element including at least one selected from the group consisting of Cr, V, Mn, Ti and Sc) is taken as a second element. The multiple first non-magnetic regions 21N are, for example, Cr layers. The multiple first magnetic regions 21M include at least one selected from the group consisting of Fe, Co and Ni. An element included in the multiple first magnetic regions 21M (an element including at least one selected from the group consisting of Fe, Co, and Ni) is taken as a third element. The multiple first magnetic regions 21M may include, for example, a FeCo alloy, a FeNi alloy, a FeCoNi alloy, or the like.

As shown in FIG. 1A, in this example, the stacked body 20 includes the second layer 42. The second layer 42 is provided between the second magnetic member 22 and the second magnetic pole 32. The second layer 42 includes Cu. The second layer 42 is, for example, a Cu layer. The second layer 42 is a non-magnetic layer. By providing the second layer 42, for example, the magnetization of the second magnetic layer 22 is reversed in an orientation opposite to the X-axis component of the magnetization of the second magnetic pole 32 due to the polarized electrons injected from the side of the second magnetic pole 32.

As shown in FIG. 1A, the stacked body 20 includes a second magnetic pole side magnetic layer 25b. The second magnetic pole side magnetic layer 25b is provided between the second layer 42 and the second magnetic pole 32. The second magnetic pole side magnetic layer 25b includes at least one selected from the group consisting of Fe, Co and Ni. The second magnetic pole side magnetic layer 25b may include the same material as the second magnetic pole 32. In this case, the second magnetic pole side magnetic layer 25b may be regarded as a portion of the second magnetic pole 32. The second layer 42 and the second magnetic pole side magnetic layer 25b are provided as necessary and may be omitted. The thickness of the second magnetic pole side magnetic layer 25b (for example, the length along the X-axis direction) is preferably thin. The thickness of the second magnetic pole side magnetic layer 25b is, for example, not less than 0.15 nm and not more than 3 nm.

As shown in FIG. 1A, the stacked body 20 may further include a third layer 43. The third layer 43 is provided between the first magnetic pole 31 and the first magnetic member 21. The third layer 43 includes, for example, at least one selected from the group consisting of Ta, Ru and Cr. The third layer 43 functions as, for example, a base layer. By providing the third layer 43, for example, the magnetic coupling between the first magnetic pole 31 and the first magnetic member 21 is likely to be substantially broken. The third layer 43 is provided as needed and may be omitted.

In the first magnetic member 21 according to the embodiment, the first non-magnetic region 21N that includes the second element (Cr, etc.) is located between the multiple first magnetic regions 21M that include the third element (Fe, etc.). For example, the multiple first magnetic regions 21M and the multiple first nonmagnetic regions 21N may be alternately provided. Due to such a configuration, the first magnetic member 21M can have large and stable negative spin polarization.

For example, in an alloy that includes the third element (Fe, etc.) and the second element (Cr), the first and second elements do not form a solid solution in the equilibrium state. In the alloy, there is a tendency for the alloy to be separated into a mixture of regions (e.g., grains) that include the third element and regions (e.g., grains) that include the second element. Negative spin polarization easily occurs when the regions (e.g., the grains) that include the third element (Fe, etc.) are small. For example, the negative spin polarization is combined at the interface between Fe and Cr. The negative spin polarization is easily caused thereby.

On the other hand, when heat or the like is applied, the spin polarization easily becomes positive. It is considered that this is because the applied heat increases the sizes of the regions (e.g., the grains) including the third element (Fe, etc.) and further increases the distance between the multiple regions including the third element. For example, positive spin polarization is increased by the Fe grains becoming larger. The amount (the surface area per unit volume) of the interface between Fe and Cr decreases, and the negative spin polarization at the interface between Fe and Cr decreases.

Thus, in an alloy that includes the third element (e.g., Fe, etc.) and the second element (e.g., Cr), the polarity of the spin polarization changes in the heat treatment, etc.; and the spin polarization easily becomes positive.

Conversely, according to the embodiment, for example, the first non-magnetic region 21N that includes the second element (e.g., Cr, etc.) is alternately arranged between two first magnetic regions 21M that include the third element (e.g., Fe, etc.). For example, the first magnetic region 21M has a layer configuration; and the first nonmagnetic region 21N has a layer configuration. Therefore, these regions are stable even when heat treatment is performed. Mixing of these regions can be suppressed. By setting the thickness of the first magnetic region 21M to be sufficiently thin, negative spin polarization is maintained. The interface between the first magnetic region 21M and the first nonmagnetic region 21N is stable and can exist with a high density. By setting the thickness of the first nonmagnetic region 21N to be sufficiently thin, the magnetizations of the multiple first magnetic regions 21M that are next to each other become continuous. Therefore, for example, the first magnetic member 21 can have stable negative spin polarization. Similarly, the second magnetic member 22 can have stable negative spin polarization.

According to the embodiment, such a first magnetic member 21, such a second magnetic member 22, and the first layer 41 are combined. When the current Id is supplied to the stacked body 20, for example, the first magnetic member 21 functions as, for example, a spin injection layer. The magnetization of the second magnetic member 22 changes (for example, oscillates). Because the magnetization of the magnetic member included in the stacked body 20 changes (oscillates), alternating magnetic field is generated. The alternating magnetic field is, for example, a high frequency magnetic field. The alternating magnetic field is applied to the magnetic recording medium 80, and NAMR is performed.

In a case where the third layer 43 is not provided, or the third layer 43 includes a material that is easily spin-diffused (for example, a material including at least one selected from the group consisting of Co, Ni, and Fe, Pt, and the like), the magnetization of the first magnetic member 21 is substantially fixed, and the magnetization of the second magnetic member 22 changes. In a case where the third layer 43 is provided and includes a material that is difficult to spin-diffuse (for example, at least one selected from the group consisting of Ta, Ru and Cr), the magnetization of the first magnetic member 21 and the magnetization of the second magnetic member 22 change. For example, the recording magnetic field is efficiently applied to the magnetic recording medium 80.

The first magnetic member 21 is, for example, a negative spin injection layer. In such a case, the positive spin injection from the second magnetic pole 32 side and the negative spin injection from the first magnetic member 21 side are superimposed. For example, when the first magnetic member 21 has positive spin polarization, the positive spin injection from the second magnetic pole 32 side and the positive spin injection from the first magnetic member 21 side act to cancel each other. According to the embodiment, by using the first magnetic member 21 such as that described above, the magnetization of the second magnetic member 22 is effectively changed (for example, oscillate) and reversed.

According to the embodiment, even after heat treatment or the like is performed, the magnetic characteristics of the first magnetic member 21 and the second magnetic member 22 are stable; and high heat resistance is obtained. According to the embodiment, a magnetic head can be provided in which stable operations are possible.

In the embodiment, for example, the thickness of the first magnetic member 21 is taken as the thickness t21 (see FIG. 1A). The thickness of the second magnetic member 22 is taken as the thickness t22 (see FIG. 1A). These thicknesses are lengths along the stacking direction (first direction, for example, the X-axis direction). In the embodiment, the thickness t21 is preferably thinner than the thickness 22. In FIG. 1A, the thickness t21 is drawn thicker than the thickness t22 in order to make the figure easier to see. The thickness t21 of the first magnetic member 21 is, for example, not less than 1.5 nm and not more than 4 nm. The thickness t22 of the second magnetic member 22 is, for example, not less than 3 nm and not more than 10 nm.

As shown in FIG. 1A, the thickness of the first layer 41 along the first direction is taken as the first layer thickness t41. As shown in FIG. 1B, the thickness of the first non-magnetic region 21N along the first direction is taken as the first non-magnetic region thickness tN1. The first direction is the direction from the first magnetic member 21 to the second magnetic member 22. The first direction is the stacking direction. In the embodiment, the first layer thickness t41 is thicker than the first non-magnetic region thickness tN1. Since the thickness tN1 of the first non-magnetic region is thin, negative spin polarization can be stably obtained as described above. For example, the thickness t41 of the first layer exceeds 1 times the thickness tN1 of the first non-magnetic region and is not more than 16.7 times. For example, the thickness t41 of the first layer is not less than 1.2 times and not more than 10 times the thickness tN1 of the first non-magnetic region tN1.

In the embodiment, the thickness tN1 of the first non-magnetic region is preferably not less than 0.15 nm and not more than 0.8 nm, for example. Negative spin polarization is stably obtained. When the thickness tN1 of the first non-magnetic region is not less than 0.15 nm, for example, a uniform film can be easily obtained. When the thickness tN1 of the first non-magnetic region is not more than 0.8 nm, for example, the density of the interface can be increased, and a high negative MR ratio can be easily obtained.

The thickness of the multiple first magnetic regions 21M along one first direction is taken as the first magnetic region thickness tM1. The thickness tM1 of the first magnetic region is preferably not less than 0.15 nm and not more than 0.8 nm, for example. Negative spin polarization is stably obtained. When the thickness tM1 of the first magnetic region is not less than 0.15 nm, for example, a uniform film can be easily obtained. When the thickness tM1 of the first magnetic region is not more than 0.8 nm, for example, the density of the interface can be increased, and a high negative MR ratio can be easily obtained.

In the embodiment, the thickness of the first layer t41 is preferably not less than 0.8 nm and not more than 2.5 nm, for example. The first layer thickness t41 is more preferably not less than 0.8 nm and not more than 1.2 nm, for example.

In the following, an example of the relationship between the first layer thickness t41 and the characteristics will be described.

Figure 3:
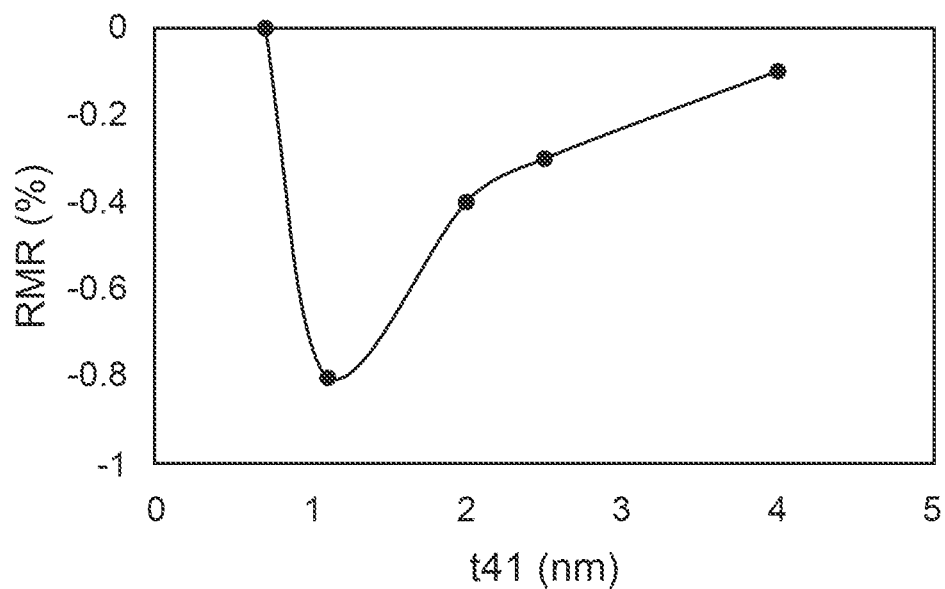
FIG. 3 is a graph view illustrating characteristics of the magnetic head.

FIG. 3 is a graph view illustrating characteristics of the magnetic head.

In the example shown in FIG. 3, the second magnetic member 22 includes NiFe. NiFe has positive spin polarization. A magnetic field along the X-axis direction (see FIG. 1A) is applied to the stacked body 20. The horizontal axis of FIG. 3 is the first layer thickness t41. The vertical axis is the MR ratio RMR. As the first layer thickness t41 decreases from 4 nm to 1.1 nm, the absolute value of the negative MR ratio RMR increases. An increase in the absolute value of the MR ratio RMR means that the spin torque efficiency is improved. By improving the spin torque efficiency, for example, the orientation of the magnetization of the second magnetic member 22 can be easily changed with a small current.

On the other hand, in the production of the magnetic head, when the thickness t41 of the first layer is 4 nm, the first layer 41 is difficult to be scraped during the polishing process, and the magnetic pole surface 30F (for example, the surface facing the medium) is likely to have irregularities. In this case, the head is easily broken by long-term use. When the first layer thickness t41 is 0.7 nm, the MR ratio is substantially 0. It is considered that this is because when the first layer thickness t41 is 0.7 nm, the first magnetic member 21 and the second magnetic member 22 are strongly magnetically coupled to each other, and the magnetization of the second magnetic member 22 does not substantially change.

From this, the first layer thickness t41 is preferably, for example, not less than 0.8 nm and not more than 2.5 nm.

The first layer thickness t41 is more preferably not less than 0.8 nm and not more than 1.2 nm, for example. For example, the RKKY magnetic head coupling and the parallel magnetic coupling caused by the interfacial unevenness tend to act so as to cancel each other out. As a result, the magnetic coupling between the first layer 41 and the first magnetic member 21 can be suppressed.

Since the first layer thickness t41 of the first layer 41 including Cr and the like is not more than 2.5 nm, for example, polishing becomes easy and the shape can be easily controlled with high accuracy.

As described above, the first magnetic member 21 may include multiple first non-magnetic regions 21N. One of the multiple first magnetic regions 21M is between one of the multiple first non-magnetic regions 21N and another one of the multiple first non-magnetic regions 21N. In the embodiment, the number of the multiple first magnetic regions 21M (that is, the number of layers) is not less than 2 and not more than 20. Since the number of the multiple first magnetic regions 21M is not less than 2, for example, the effect of increasing the absolute value of the MR ratio RMR by the multiple interfaces becomes clear. When the number of the multiple first magnetic regions 21M is not less than 20, the effect of increasing the absolute value of the MR ratio RMR becomes small. When the number of the multiple first magnetic regions 21M is not less than 20, the distance between the two magnetic poles becomes excessively long, and it becomes difficult to improve the recording density.

In the embodiment, one of the multiple first non-magnetic regions 21N may be in contact with the first layer 41. In another example, one of the multiple first magnetic regions 21M may be in contact with the first layer 41.

In the following, an example of the second magnetic member 22 will be described.

In one example, the second magnetic member 22 includes at least one selected from the group consisting of Fe, Co and Ni. The second magnetic member 22 may include, for example, a FeCo alloy, a FeNi alloy, a FeCoNi alloy, or the like.

Figure 4:
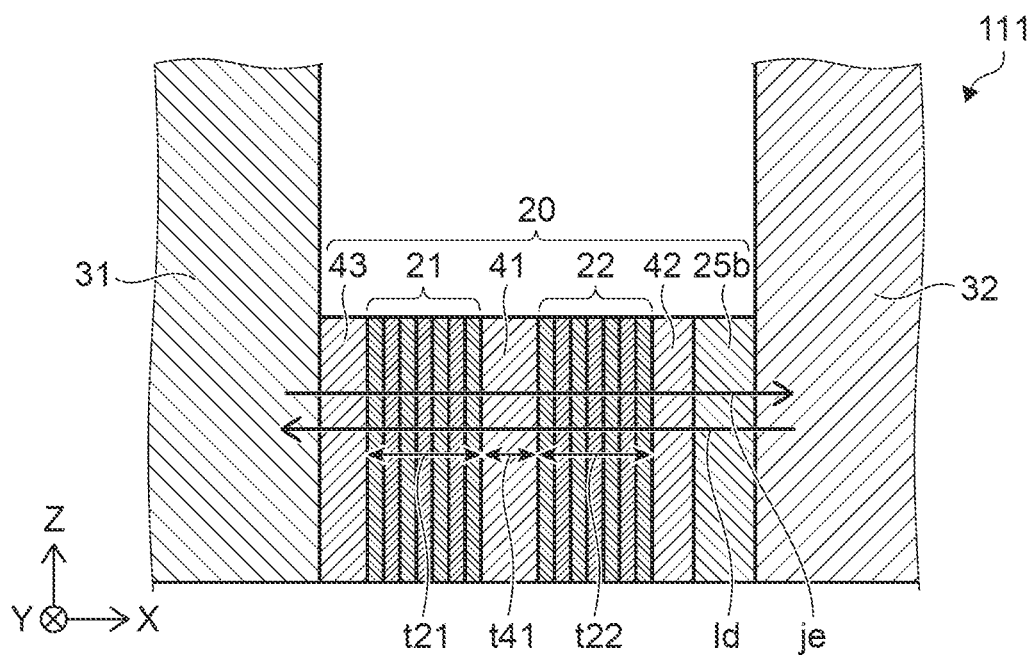
FIG. 4 is a schematic cross-sectional view illustrating a magnetic head according to the first embodiment.

FIG. 4 is a schematic cross-sectional view illustrating a magnetic head according to the first embodiment.

As shown in FIG. 4, in a magnetic head 111 according to the embodiment, the second magnetic member 22 has a stacked structure of multiple layers. For example, the second magnetic member 22 has negative spin polarization.

Figure 5:
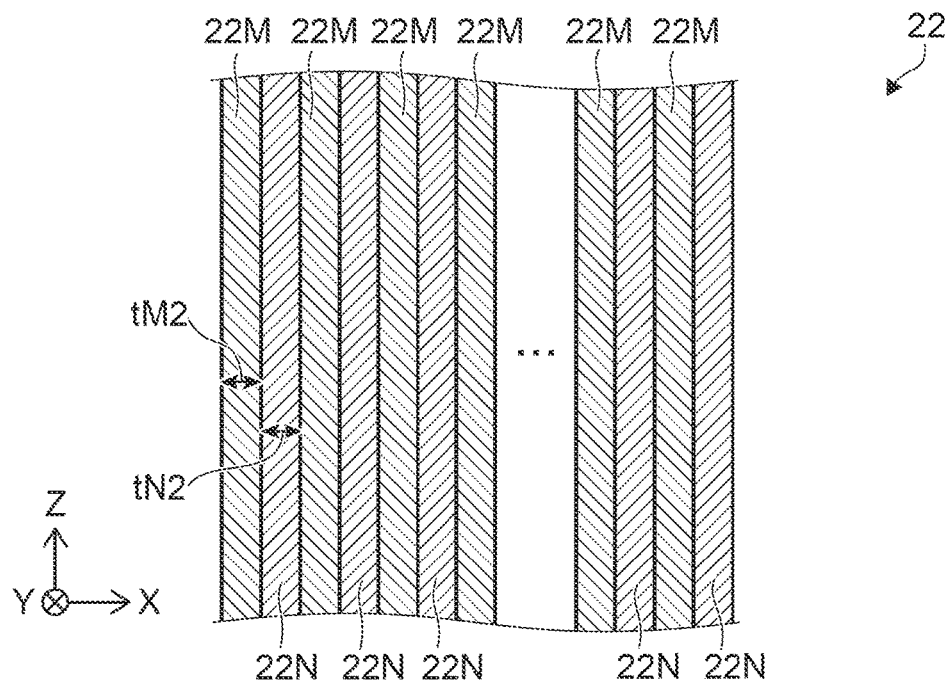
FIG. 5 is a schematic cross-sectional view illustrating a portion of the magnetic head according to the first embodiment.

FIG. 5 is a schematic cross-sectional view illustrating a portion of the magnetic head according to the first embodiment.

FIG. 5 shows an example of the second magnetic member 22 in the magnetic head 111. As shown in FIG. 5, in this example, the second magnetic member 22 includes multiple second magnetic regions 22M and a second non-magnetic region 22N. The direction from one of the multiple second magnetic regions 22M toward another one of the multiple second magnetic regions 22M is along the above-mentioned first direction (stacking direction). The second non-magnetic region 22N is between the above-mentioned one of the multiple second magnetic regions 22M and the above-mentioned another one of the multiple second magnetic regions 22M. The second non-magnetic region 22N includes at least one selected from the group consisting of Cr, V, Mn, Ti and Sc. The multiple second magnetic regions 22M include at least one selected from the group consisting of Fe, Co and Ni. The second magnetic member 22 may include multiple second non-magnetic regions 22N. One of the multiple second magnetic regions 22M is between one of the multiple second non-magnetic regions 22N and another one of the multiple second non-magnetic regions 22N.

For example, the thickness tN2 of the second non-magnetic region along the first direction of the second non-magnetic region 22N is preferably not less than 0.15 nm and not more than 0.8 nm. The thickness tM2 of the first magnetic region along one first direction of the multiple second magnetic regions 22M is preferably not less than 0.15 nm and not more than 0.8 nm.

Figure 6:
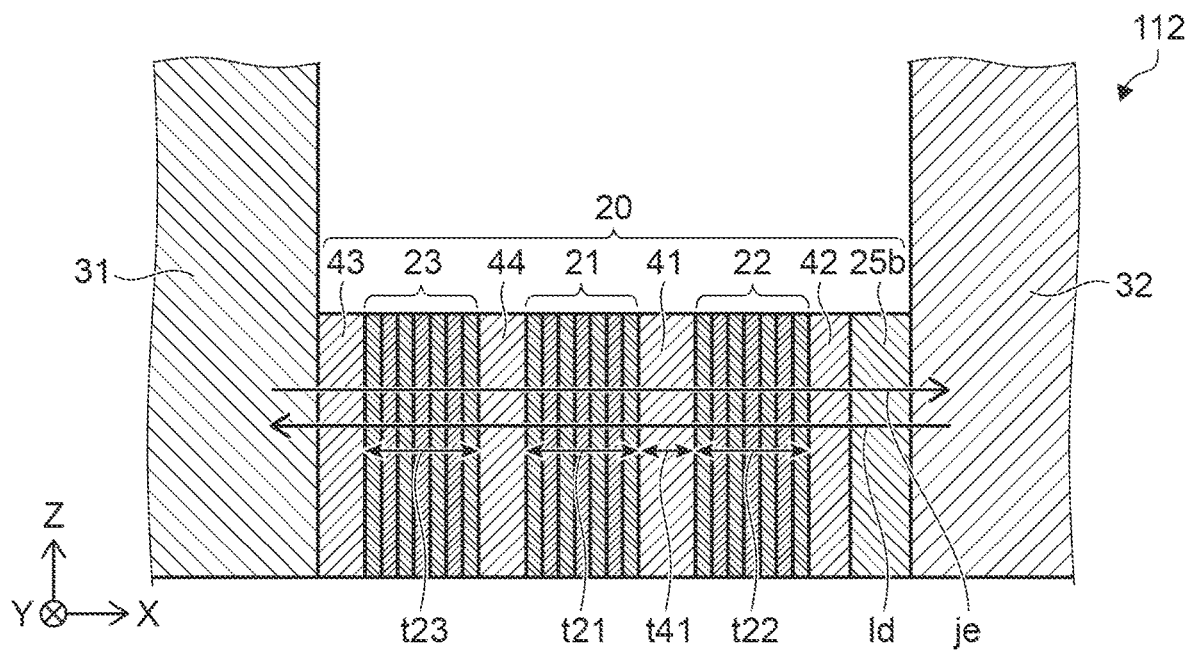
FIG. 6 is a schematic cross-sectional view illustrating a magnetic head according to the first embodiment.

FIG. 6 is a schematic cross-sectional view illustrating a magnetic head according to the first embodiment.

In a magnetic head 112 according to the embodiment as shown in FIG. 6, the stacked body 20 includes a third magnetic member 23 and a fourth layer 44 in addition to the first magnetic member 21, the second magnetic member 22, the first layer 41, the second layer 42, the third layer 43 and the second magnetic pole side magnetic layer 25b.

The third magnetic member 23 is located between the first magnetic pole 31 and the first magnetic member 21. The fourth layer 44 is located between the third magnetic member 23 and the first magnetic member 21. For example, the third magnetic member 23 has negative spin polarization.

Figure 7:
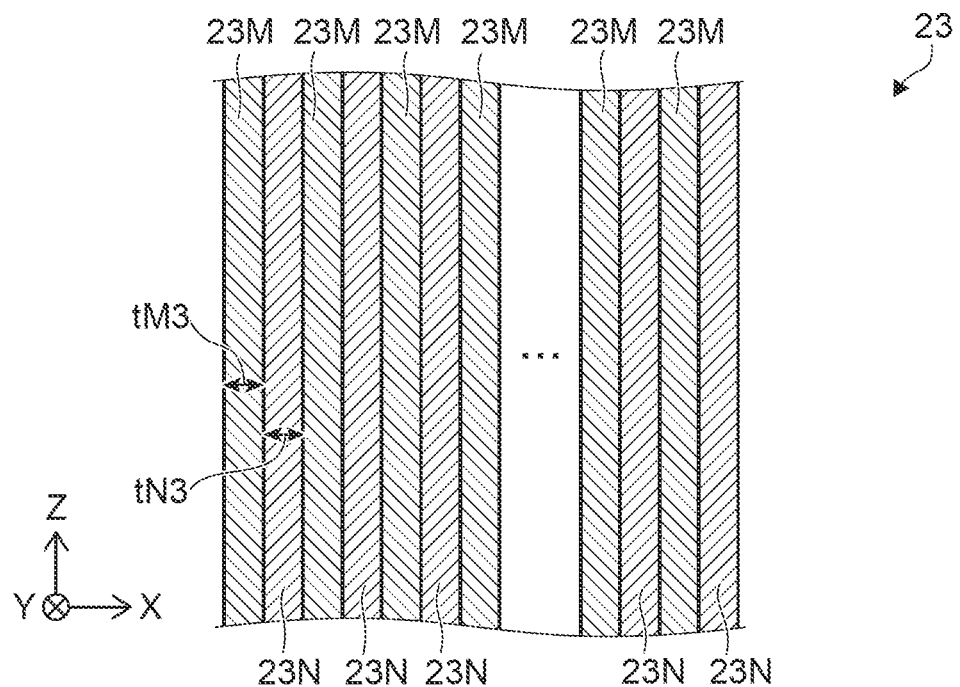
FIG. 7 is a schematic cross-sectional view illustrating a portion of the magnetic head according to the first embodiment.

FIG. 7 is a schematic cross-sectional view illustrating a portion of the magnetic head according to the first embodiment.

As shown in FIG. 7, the third magnetic member 23 includes multiple third magnetic regions 23M and a third non-magnetic region 23N. The direction from one of the multiple third magnetic regions 23M toward another one of the multiple third magnetic regions 23M is along the first direction (for example, the stacking direction). The third non-magnetic region 23N is between the above-mentioned one of the multiple third magnetic regions 23M and the above-mentioned another one of the multiple third magnetic regions 23M. The third non-magnetic region 23N includes at least one selected from the group consisting of Cr, V, Mn, Ti and Sc. The multiple third magnetic regions 23M include at least one selected from the group consisting of Fe, Co and Ni. The third magnetic member 23 may include multiple third non-magnetic regions 23N. One of the multiple third magnetic regions 23M is between one of the multiple third non-magnetic regions 23N and another one of the multiple third non-magnetic regions 23N.

For example, the thickness tN3 of the third non-magnetic region along the first direction of the third non-magnetic region 23N is preferably not less than 0.15 nm and not more than 0.8 nm. The thickness tM3 of the first magnetic region along one first direction of the multiple third magnetic regions 23M is preferably not less than 0.15 nm and not more than 0.8 nm.

In the embodiment, for example, the thickness of the third magnetic member 23 is taken as t23 (see FIG. 7). The thickness t23 is preferably not less than the thickness t21. The thickness t23 is preferably thinner than the thickness t22. The thickness t22 is, for example, not less than 1.5 nm and not more than 4 nm.

The fourth layer 44 includes, for example, at least one selected from the group consisting of Cr, V, Mn, Ti and Sc.

In the following, some examples of the magnetic head and the magnetic recording device according to the embodiment will be described.

Figure 8:
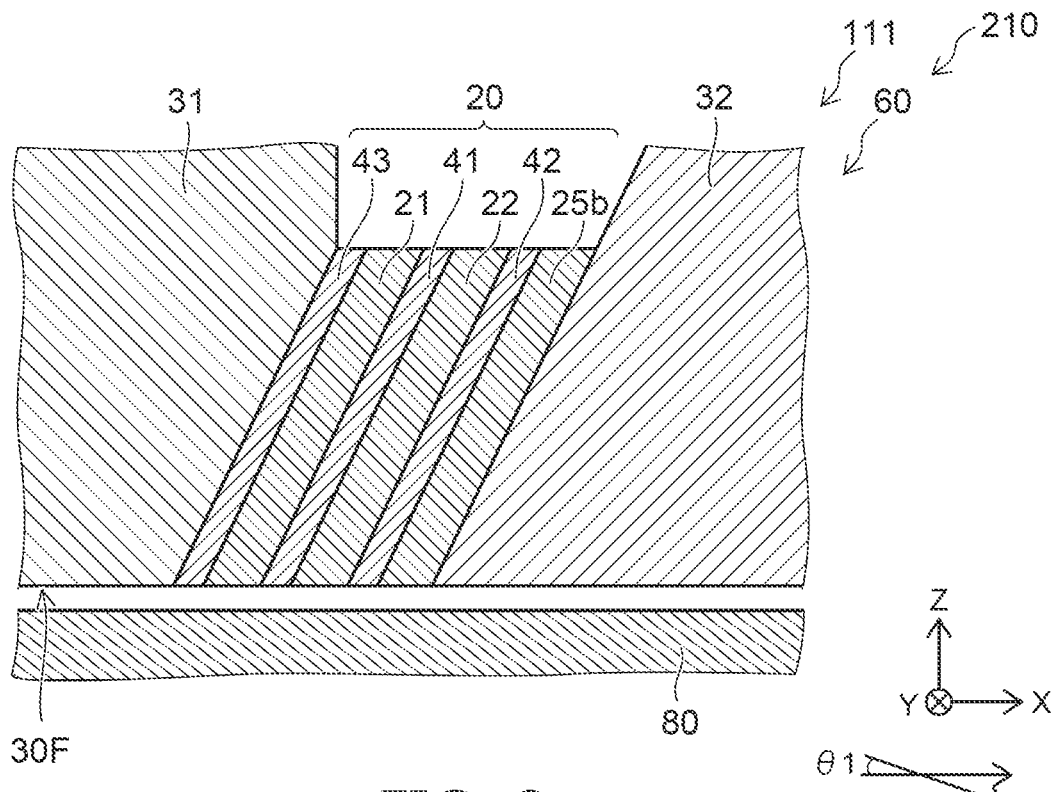
FIG. 8 is a schematic cross-sectional view illustrating the magnetic head according to the first embodiment.

FIG. 8 is a schematic cross-sectional view illustrating the magnetic recording device according to the first embodiment.

As shown in FIG. 8, the direction D1 from the first magnetic pole 31 toward the second magnetic pole 32 may be oblique to the X-axis direction. The direction D1 corresponds to the stacking direction (first direction) of the stacked body 20. The X-axis direction is along the magnetic pole surface 30F of the first magnetic pole 31. An angle between the direction D1 and the magnetic pole surface 30F is taken as an angle θ1. The angle θ1 is, for example, not less than 15 degrees and not more than 30 degrees. The angle θ1 may be 0 degrees.

Figure 9:
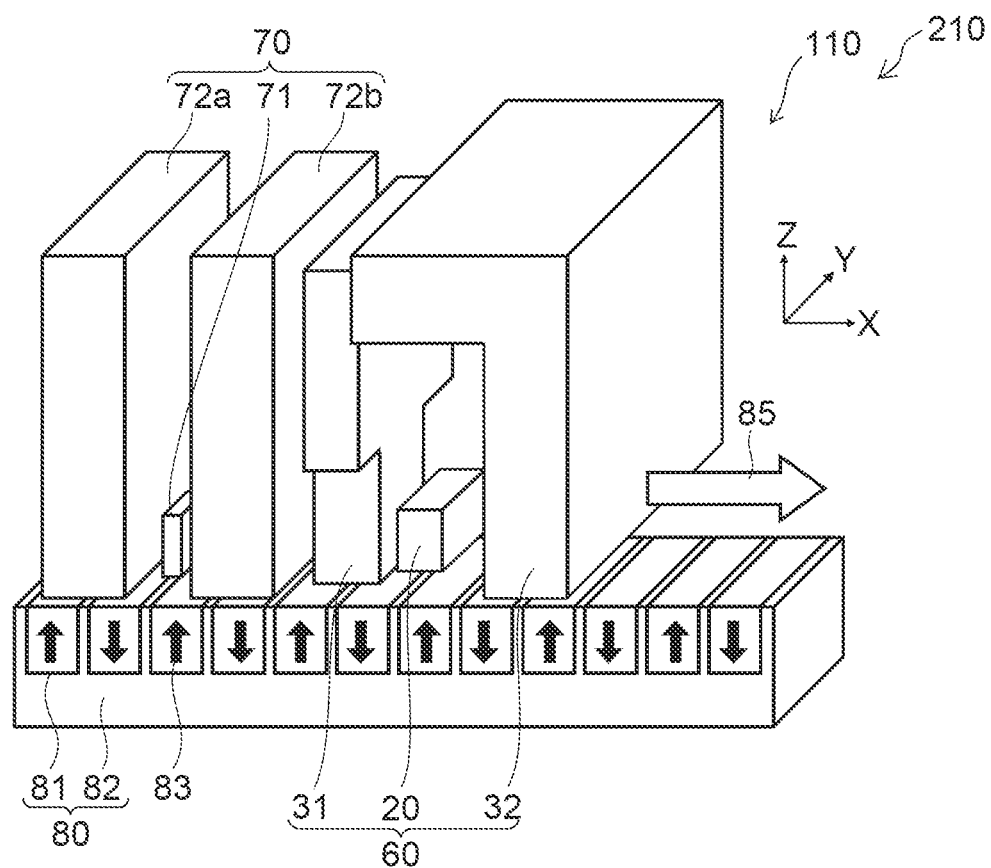
FIG. 9 is a schematic perspective view illustrating the magnetic head according to the embodiment.

FIG. 9 is a schematic perspective view illustrating the magnetic head according to the embodiment.

As shown in FIG. 9, the magnetic head 110 includes, for example, the recording part 60 and a reproducing part 70. Information is recorded in the magnetic recording medium 80 by the recording part 60 of the magnetic head 110. The information that is recorded in the magnetic recording medium 80 is reproduced by the reproducing part 70.

The magnetic recording medium 80 includes, for example, a medium substrate 82, and a magnetic recording layer 81 provided on the medium substrate 82. A magnetization 83 of the magnetic recording layer 81 is controlled by the recording part 60.

The reproducing part 70 includes, for example, a first reproducing shield 72a, a second reproducing shield 72b, and a magnetic reproducing element 71. The magnetic reproducing element 71 is located between the first reproducing shield 72a and the second reproducing shield 72b. The magnetic reproducing element 71 is configured to output a signal corresponding to the magnetization 83 of the magnetic recording layer 81.

As shown in FIG. 9, the magnetic recording medium 80 moves relative to the magnetic head 110 in a medium movement direction 85. The information that corresponds to the magnetization 83 of the magnetic recording layer 81 is controlled by the magnetic head 110 at any position. The information that corresponds to the magnetization 83 of the magnetic recording layer 81 is reproduced by the magnetic head 110 at any position.

Figure 10:
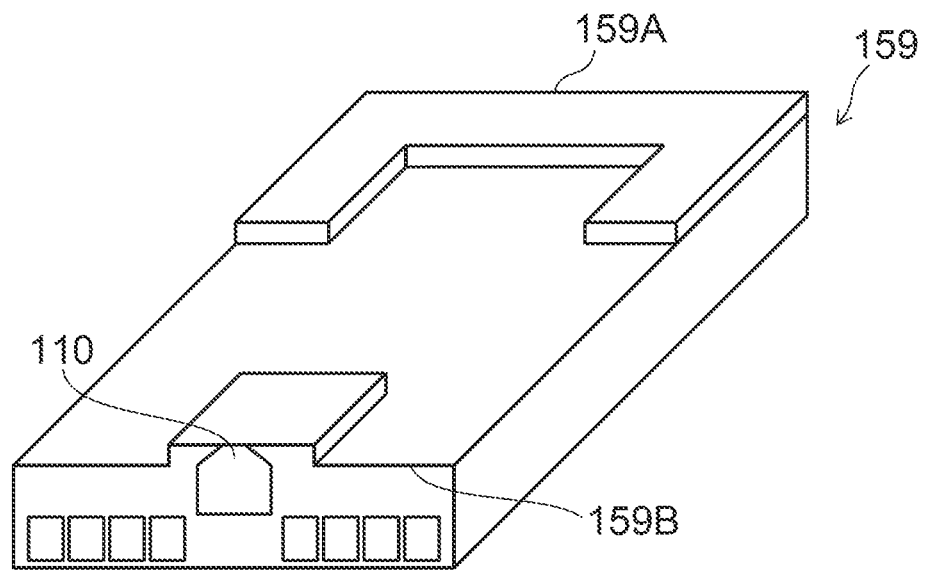
FIG. 10 is a schematic perspective view illustrating a portion of the magnetic recording device according to the embodiment.

FIG. 10 is a schematic perspective view illustrating a portion of the magnetic recording device according to the embodiment.

FIG. 10 illustrates a head slider.

The magnetic head 110 is provided in the head slider 159. The head slider 159 includes, for example, $Al_2O_3$/TiC, etc.

The head slider 159 moves relative to the magnetic recording medium 80 while flying over or contacting the magnetic recording medium 80.

The head slider 159 has, for example, an air inflow side 159A and an air outflow side 159B. The magnetic head 110 is located at the side surface of the air outflow side 159B of the head slider 159 or the like. Thereby, the magnetic head 110 moves relative to the magnetic recording medium while flying over or contacting the magnetic recording medium.

Figure 11:
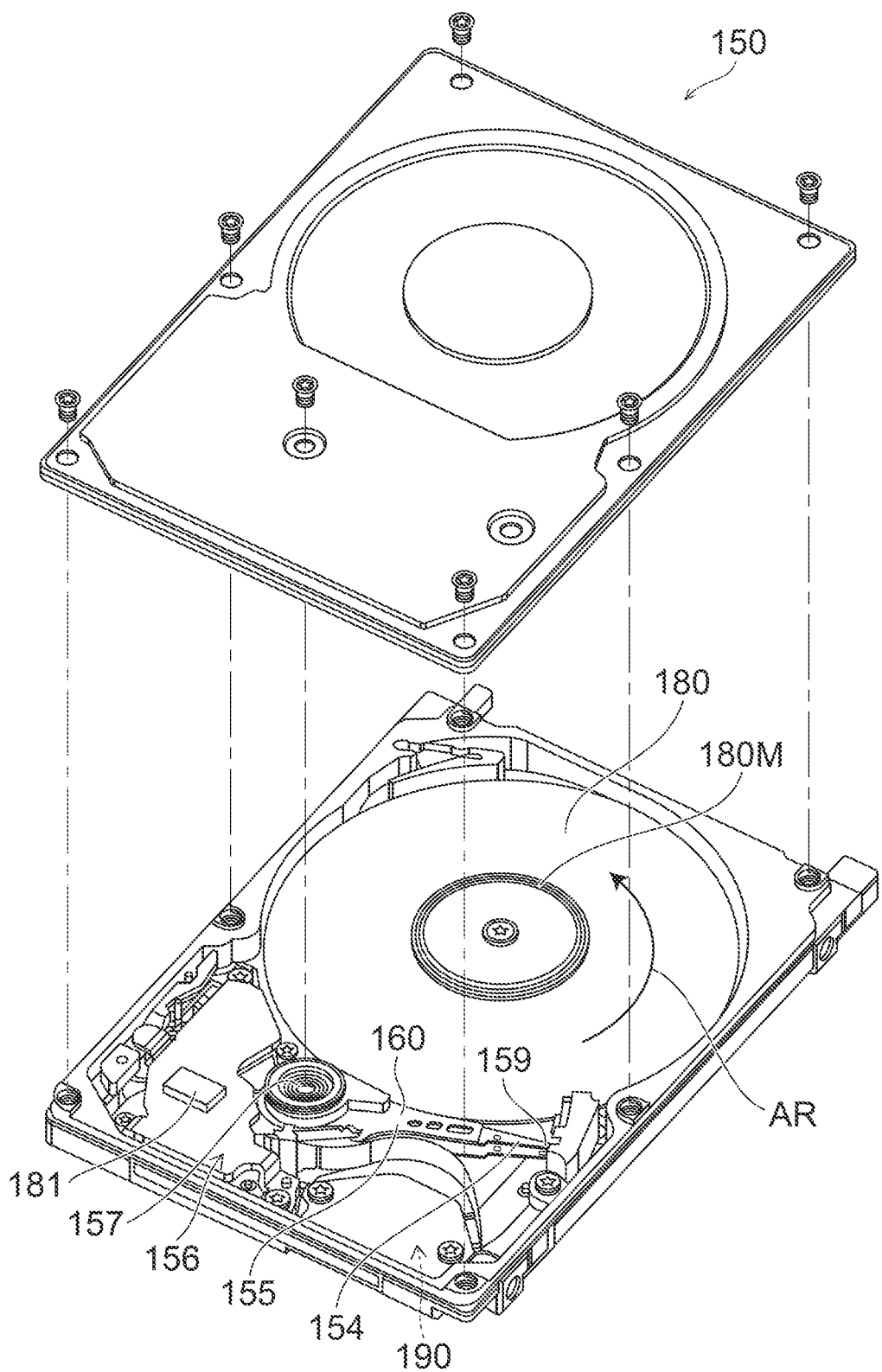
FIG. 11 is a schematic perspective view illustrating the magnetic recording device according to the embodiment.

FIG. 11 is a schematic perspective view illustrating a magnetic recording device according to the embodiment.

As shown in FIG. 11, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head (e.g., the magnetic head 110) according to the embodiment is provided at the tip vicinity of the head slider 159.

When the recording medium disk 180 rotates, the downward pressure due to the suspension 154 and the pressure generated by the medium-facing surface (the ABS) of the head slider 159 are balanced. The distance between the medium-facing surface of the head slider 159 and the surface of the recording medium disk 180 becomes a prescribed fly height. According to the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is located between the permanent magnet and the opposing yoke. The suspension 154 includes one end and another end. The magnetic head (e.g., the magnetic head 110) is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

Figure 12A:
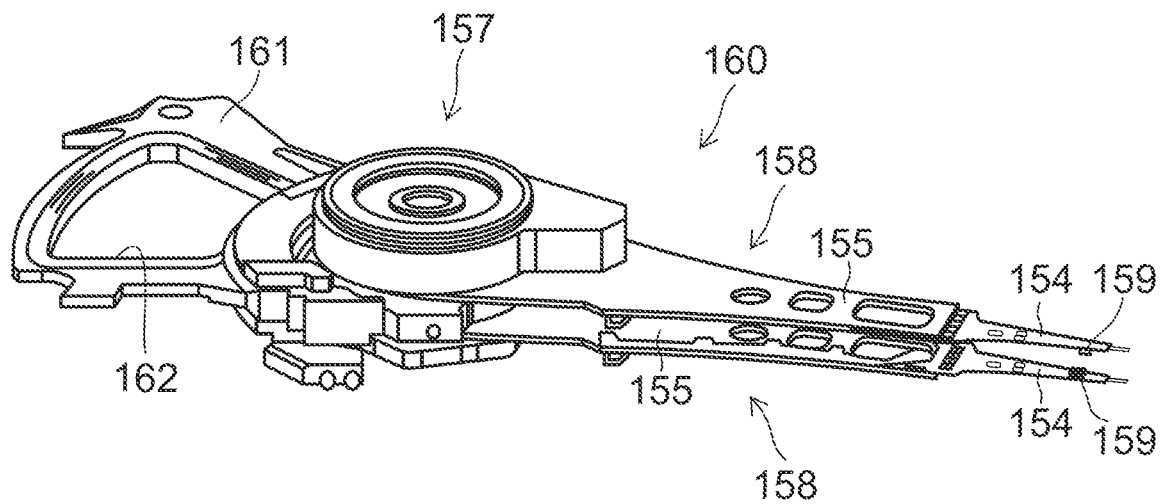
FIGS. 12A and 12B are schematic perspective views illustrating a portion of the magnetic recording device according to the embodiment.
Figure 12B:
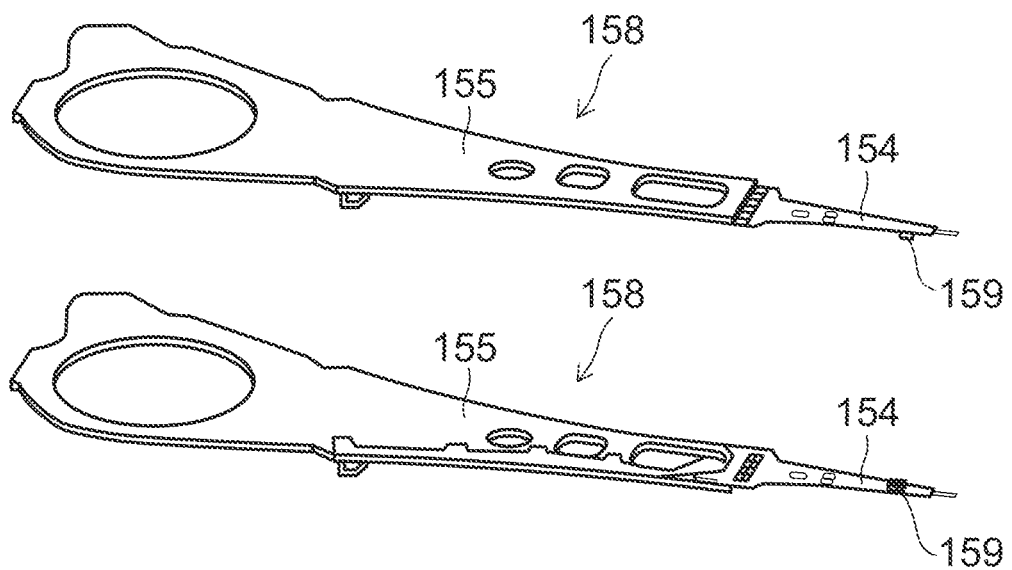

FIGS. 12A and 12B are schematic perspective views illustrating a portion of the magnetic recording device according to the embodiment.

FIG. 12A illustrates the configuration of a portion of the magnetic recording device and is an enlarged perspective view of a head stack assembly 160.

FIG. 12B is a perspective view illustrating a magnetic head assembly (a head gimbal assembly (HGA)) 158 that is a portion of the head stack assembly 160.

As shown in FIG. 12A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 12B, the head gimbal assembly 158 includes the arm 155 extending from the bearing part 157, and the suspension 154 extending from the arm 155.

The head slider 159 is provided at the tip of the suspension 154. The magnetic head (e.g., the magnetic head 110) according to the embodiment is provided in the head slider 159.

The magnetic head assembly (the head gimbal assembly) 158 according to the embodiment includes the magnetic head (e.g., the magnetic head 110) according to the embodiment, the head slider 159 in which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wire (not illustrated) for an oscillation element, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate, or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium described above. The movable part described above includes, for example, the head slider 159. The position controller described above includes, for example, the head gimbal assembly 158.

The embodiment may include the following configurations (eg, technical proposals).

Configuration 1

A magnetic head, comprising:
    a first magnetic pole;
    a second magnetic pole; and
    a stacked body provided between the first magnetic pole and the second magnetic pole, the stacked body including
a first magnetic member,
a second magnetic member provided between the first magnetic member and the second magnetic member, and
a first layer provided between the first magnetic member and the second magnetic member, and including at least one selected from the group consisting of Cr, V, Mn, Ti and Sc,
the first magnetic member including a plurality of first magnetic regions and a first non-magnetic region,
a direction from one of the first magnetic regions toward another one of the first magnetic regions being along a first direction from the first magnetic pole toward the second magnetic pole,
the first non-magnetic region being between the one of the first magnetic regions and the other one of the first magnetic regions,
the first non-magnetic region including at least one selected from the group consisting of Cr, V, Mn, Ti and Sc,
the first magnetic regions including at least one selected from the group consisting of Fe, Co and Ni, and
a first layer thickness along the first direction of the first layer being thicker than a first non-magnetic region thickness along the first direction of the first non-magnetic region.

Configuration 2
The head according to Configuration 1, wherein
the first layer thickness exceeds 1 times the first non-magnetic region thickness and is not more than 16.7 times.

Configuration 3
The head according to Configuration 2, wherein
the first layer thickness is not less than 0.8 nm and not more than 2.5 nm.

Configuration 4
The head according to Configuration 2, wherein
the first layer thickness is not less than 0.8 nm and not more than 1.2 nm.

Configuration 5
The head according to any one of Configurations 2 to 4, wherein
the first non-magnetic region thickness is not less than 0.15 nm and not more than 0.8 nm.

Configuration 6
The head according to any one of Configurations 1 to 5, wherein
a first magnetic region thickness along the first direction of the one of the first magnetic regions is not less than 0.1 nm and not more than 0.8 nm.

Configuration 7
The head according to any one of Configurations 1 to 6, wherein
the first magnetic member includes a plurality of the first non-magnetic regions,
one of the first magnetic regions is between one of the first non-magnetic regions and another one of the first non-magnetic regions.

Configuration 8
The head according to Configuration 7, wherein
number of the first magnetic regions is not less than 2 and not more than 20.

Configuration 9
The head according to Configuration 7 or 8, wherein
one of the first non-magnetic regions is in contact with the first layer.

Configuration 10
The head according to any one of Configurations 1 to 9, wherein
one of the first magnetic regions is in contact with the first layer.

Configuration 11
The head according to any one of Configurations 1 to 10, wherein
the stacked body includes a second layer provided between the second magnetic member and the second magnetic pole, and
the second layer includes Cu.

Configuration 12
The head according to Configuration 11, wherein
the stacked body includes a second magnetic pole side magnetic layer provided between the second layer and the second magnetic pole, and
the second magnetic pole side magnetic layer includes at least one selected from the group consisting of Fe, Co and Ni.

Configuration 13
The head according to any one of Configurations 1 to 12, wherein
the stacked body includes a third layer provided between the first magnetic pole and the first magnetic member, and
the third layer includes at least one selected from the group consisting of Ta, Ru and Cr.

Configuration 14
The head according to any one of Configurations 1 to 12, wherein
the stacked body further includes a third magnetic member provided between the first magnetic pole and the first magnetic member,
the third magnetic member includes a plurality of third magnetic regions and a third non-magnetic region,
a direction from one of the third magnetic regions toward another one of the third magnetic regions is along the first direction,
the third non-magnetic region is between the one of the third magnetic regions and the other one of the third magnetic regions,
the third non-magnetic region includes at least one selected from the group consisting of Cr, V, Mn, Ti and Sc, and
the third magnetic regions include at least one selected from the group consisting of Fe, Co and Ni.

Configuration 15
The head according to any one of Configurations 1 to 14, wherein
the second magnetic member includes at least one selected from the group consisting of Fe, Co and Ni.

Configuration 16
The head according to any one of Configurations 1 to 14, wherein
the second magnetic member includes a plurality of second magnetic regions and a second non-magnetic region,
a direction from one of the second magnetic regions toward another one of the second magnetic regions is along the first direction,
the second non-magnetic region is between the one of the second magnetic regions and the other one of the second magnetic regions,
the second non-magnetic region includes at least one selected from the group consisting of Cr, V, Mn, Ti and Sc, and
the second magnetic regions include at least one selected from the group consisting of Fe, Co and Ni.

Configuration 17
  The head according to Configuration 16, wherein
  the second magnetic member includes a plurality of the second non-magnetic regions, and
  one of the second magnetic regions is between one of the second non-magnetic regions and the other one of the second non-magnetic regions.
Configuration 18
  The head according to any one of Configurations 1 to 17, wherein
  when a current having an orientation from the second magnetic member toward the first magnetic member flows through the stacked body, an alternating magnetic field is emitted from the stacked body.
Configuration 19
  A magnetic recording device, comprising:
  the magnetic head according to any one of Configurations 1 to 17; and
  an electric circuit,
  the electric circuit being configured to supply a current to the magnetic head, and
  the current having an orientation from the second magnetic member toward the first magnetic member.
Configuration 20
  The device according to Configuration 19, wherein
  when the current flows through the stacked body, an alternating magnetic field is emitted from the stacked body.

According to embodiments, a magnetic head and a magnetic recording device can be provided in which stable operations are possible.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, magnetic members, magnetic regions, nonmagnetic regions, stacked bodies, magnetic layers, nonmagnetic layers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads and magnetic recording devices practicable by an appropriate design modification by one skilled in the art based on the magnetic heads and magnetic recording devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
  a first magnetic pole;
  a second magnetic pole; and
  a stacked body provided between the first magnetic pole and the second magnetic pole,
  the stacked body including
    a first magnetic member,
    a second magnetic member provided between the first magnetic member and the second magnetic member, and
    a first layer provided between the first magnetic member and the second magnetic member, and including at least one selected from the group consisting of Cr, V, Mn, Ti and Sc,
  the first magnetic member including a plurality of first magnetic regions and a first non-magnetic region,
  a direction from one of the first magnetic regions toward another one of the first magnetic regions being along a first direction from the first magnetic pole toward the second magnetic pole,
  the first non-magnetic region being between the one of the first magnetic regions and the other one of the first magnetic regions,
  the first non-magnetic region including at least one selected from the group consisting of Cr, V, Mn, Ti and Sc,
  the first magnetic regions including at least one selected from the group consisting of Fe, Co and Ni, and
  a first layer thickness along the first direction of the first layer being thicker than a first non-magnetic region thickness along the first direction of the first non-magnetic region,
  wherein
  the second magnetic member includes a plurality of second magnetic regions and a second non-magnetic region,
  a direction from one of the second magnetic regions toward another one of the second magnetic regions is along the first direction,
  the second non-magnetic region is between the one of the second magnetic regions and the other one of the second magnetic regions,
  the second non-magnetic region includes at least one selected from the group consisting of Cr, V, Mn, Ti and Sc, and
  the second magnetic regions include at least one selected from the group consisting of Fe, Co and Ni.

2. The head according to claim 1, wherein
  the first layer thickness exceeds 1 times the first non-magnetic region thickness and is not more than 16.7 times.

3. The head according to claim 2, wherein
  the first layer thickness is not less than 0.8 nm and not more than 2.5 nm.

4. The head according to claim 2, wherein
  the first layer thickness is not less than 0.8 nm and not more than 1.2 nm.

5. The head according to claim 2, wherein
  the first non-magnetic region thickness is not less than 0.15 nm and not more than 0.8 nm.

6. The head according to claim 1, wherein
a first magnetic region thickness along the first direction of the one of the first magnetic regions is not less than 0.1 nm and not more than 0.8 nm.

7. The head according to claim 1, wherein
the first magnetic member includes a plurality of the first non-magnetic regions,
one of the first magnetic regions is between one of the first non-magnetic regions and another one of the first non-magnetic regions.

8. The head according to claim 7, wherein
number of the first magnetic regions is not less than 2 and not more than 20.

9. The head according to claim 7, wherein
one of the first non-magnetic regions is in contact with the first layer.

10. The head according to claim 1, wherein
one of the first magnetic regions is in contact with the first layer.

11. The head according to claim 1, wherein
the stacked body includes a second layer provided between the second magnetic member and the second magnetic pole, and
the second layer includes Cu.

12. The head according to claim 11, wherein
the stacked body includes a second magnetic pole side magnetic layer provided between the second layer and the second magnetic pole, and
the second magnetic pole side magnetic layer includes at least one selected from the group consisting of Fe, Co and Ni.

13. The head according to claim 1, wherein
the stacked body includes a third layer provided between the first magnetic pole and the first magnetic member, and
the third layer includes at least one selected from the group consisting of Ta, Ru and Cr.

14. The head according to claim 1, wherein
the second magnetic member includes a plurality of the second non-magnetic regions, and
one of the second magnetic regions is between one of the second non-magnetic regions and the other one of the second non-magnetic regions.

15. The head according to claim 1, wherein
when a current having an orientation from the second magnetic member toward the first magnetic member flows through the stacked body, an alternating magnetic field is emitted from the stacked body.

16. A magnetic recording device, comprising:
the magnetic head according to claim 1; and
an electric circuit,
the electric circuit being configured to supply a current to the magnetic head, and
the current having an orientation from the second magnetic member toward the first magnetic member.

17. The device according to claim 16, wherein
when the current flows through the stacked body, an alternating magnetic field is emitted from the stacked body.

18. A magnetic head, comprising:
a first magnetic pole;
a second magnetic pole; and
a stacked body provided between the first magnetic pole and the second magnetic pole,
the stacked body including
a first magnetic member,
a second magnetic member provided between the first magnetic member and the second magnetic member, and
a first layer provided between the first magnetic member and the second magnetic member, and including at least one selected from the group consisting of Cr, V, Mn, Ti and Sc,
the first magnetic member including a plurality of first magnetic regions and a first non-magnetic region,
a direction from one of the first magnetic regions toward another one of the first magnetic regions being along a first direction from the first magnetic pole toward the second magnetic pole,
the first non-magnetic region being between the one of the first magnetic regions and the other one of the first magnetic regions,
the first non-magnetic region including at least one selected from the group consisting of Cr, V, Mn, Ti and Sc,
the first magnetic regions including at least one selected from the group consisting of Fe, Co and Ni, and
a first layer thickness along the first direction of the first layer being thicker than a first non-magnetic region thickness along the first direction of the first non-magnetic region,
wherein
the stacked body further includes a third magnetic member provided between the first magnetic pole and the first magnetic member,
the third magnetic member includes a plurality of third magnetic regions and a third non-magnetic region,
a direction from one of the third magnetic regions toward another one of the third magnetic regions is along the first direction,
the third non-magnetic region is between the one of the third magnetic regions and the other one of the third magnetic regions,
the third non-magnetic region includes at least one selected from the group consisting of Cr, V, Mn, Ti and Sc, and
the third magnetic regions include at least one selected from the group consisting of Fe, Co and Ni.

19. The head according to claim 18, wherein
the second magnetic member includes at least one selected from the group consisting of Fe, Co and Ni.

* * * * *